United States Patent [19]

Banerjee

[11] Patent Number: 5,288,384
[45] Date of Patent: Feb. 22, 1994

[54] WETTING OF DIAPHRAGMS

[75] Inventor: Shoibal Banerjee, Newark, Del.

[73] Assignee: E. I. Du Pont de Nemours and Company, Wilmington, Del.

[21] Appl. No.: 46,911

[22] Filed: Apr. 15, 1993

Related U.S. Application Data

[63] Continuation of Ser. No. 789,687, Nov. 8, 1991, abandoned.

[51] Int. Cl.$^5$ .............................................. C25B 13/00
[52] U.S. Cl. .................................. 204/252; 204/296; 521/27; 427/243; 427/337

[56] References Cited

U.S. PATENT DOCUMENTS

| | | | |
|---|---|---|---|
| 2,393,967 | 2/1946 | Brubaker | 260/80 |
| 2,559,752 | 7/1951 | Berry | 260/29.6 |
| 2,593,583 | 4/1952 | Lontz | 260/92.1 |
| 3,282,875 | 11/1966 | Connolly et al. | 260/29.6 |
| 3,641,104 | 2/1972 | Anderson et al. | 260/465.6 |
| 3,718,627 | 2/1973 | Grot | 260/79.3 |
| 3,852,326 | 12/1974 | Nottke | 260/465.6 |
| 3,853,720 | 12/1974 | Korach et al. | 204/98 |
| 3,944,477 | 3/1976 | Argade | 204/266 |
| 4,012,541 | 3/1977 | Hirozawa | 427/243 |
| 4,065,366 | 12/1977 | Oda et al. | 204/98 |
| 4,116,888 | 9/1978 | Ukihashi et al. | 521/31 |
| 4,127,706 | 11/1978 | Martin et al. | 429/122 |
| 4,138,426 | 2/1979 | England | 260/465.6 |
| 4,178,218 | 12/1979 | Seko | 204/98 |
| 4,193,861 | 3/1990 | Kramer et al. | 204/296 |
| 4,210,515 | 7/1980 | Patel et al. | 204/266 |
| 4,267,364 | 5/1981 | Grot et al. | 560/183 |
| 4,360,601 | 11/1982 | Copeland et al. | 521/27 |
| 4,433,082 | 2/1984 | Grot | 524/755 |
| 4,487,668 | 12/1984 | England et al. | 204/98 |
| 4,713,163 | 12/1987 | Cairns et al. | 204/296 |
| 4,810,345 | 3/1989 | Schulz et al. | 204/296 |

FOREIGN PATENT DOCUMENTS

| | | | |
|---|---|---|---|
| 17506/88 | 8/1988 | Australia | C08J 5/22 |
| 42-8505 | 4/1967 | Japan . | |
| 63-286663 | 11/1988 | Japan . | |
| 1518387 | 8/1976 | United Kingdom | 25 B/1308 |
| 2053902 | 5/1980 | United Kingdom | C08F 28/00 |

Primary Examiner—Kathryn Gorgos
Attorney, Agent, or Firm—Cary A. Levitt

[57] ABSTRACT

A diaphragm for electrolyzing alkali metal chloride solutions is provided which is one or more layers of a porous support, coated with a perfluoro ion exchange polymer and then wet with a wetting solution which has a surface tension of 22 to 45 dynes/cm. The wetting solution is preferably an aqueous alcohol and most preferably aqueous 3-6.5% butanol. The wetting solution assists in initial water penetration into the pores of the diaphragm, rendering the diaphragm hydrophilic so as to resist gas locking and premature shutdown of the electrolytic cell.

23 Claims, No Drawings

WETTING OF DIAPHRAGMS

This is a continuation of application Ser. No. 07/789,687, filed Nov. 8, 1991, now abandoned.

FIELD OF THE INVENTION

This invention concerns wetting with liquid having a selected surface tension a dry, porous, shaped filter medium or diaphragm having at least a portion of its interior pore surfaces coated with a perfluoro ion exchange polymer. This invention particularly relates to wetting a porous diaphragm with a liquid having a surface tension between 22 and 45 dynes/cm.

BACKGROUND OF THE INVENTION

In the electrolysis or electrosynthesis of chemical compounds, a porous diaphragm is often used to separate the anode and cathode compartments and the reaction products, while permitting the flow of some liquid components from one compartment to another. For example, in the production of chlorine and sodium hydroxide from brine, the brine feed flows from the anode compartment through the porous diaphragm to the cathode compartment and then is discharged from the cell.

Porous diaphragms are widely used for the electrolysis of aqueous sodium chloride to make sodium hydroxide and chlorine. While asbestos has been widely used as a porous diaphragm in electrolytic cells, it is known to present serious environmental hazards and has a short lifetime.

Synthetic diaphragms are preferred to asbestos diaphragms in many respects because they can be operated at high current density and low cell voltage without being destroyed by power upsets, fluctuations or outages. Synthetic diaphragms do not present serious environmental hazards and exhibit a longer lifetime than comparable asbestos diaphragms. The synthetic diaphragm must, however, be resistant to the chemicals employed in separation devices or electrolytic cells at temperatures which frequently approach 100° C. The effect of diaphragm structure on the performance of an electrolytic cell is quite complex. The diaphragm can be described in terms of pore size distribution, porosity, tortuosity, thickness and resultant permeability of the structure. For a given set of cell operating conditions, these parameters, and especially their uniformity across the active area of the diaphragm, determine the electrical energy usage of the cell. The art in designing a diaphragm for use in electrolytic cell is to properly balance the diaphragm properties to minimize overall electrical energy usage by reducing operating voltage while maintaining high current efficiency. This is most effectively done with a diaphragm whose properties are highly uniform across its active area.

Furthermore, the synthetic diaphragms, usually made of polytetrafluoroethylene (PTFE), are difficult to fully wet with the electrolyte. If the diaphragm is not fully wetted, gas bubbles generated at the electrodes will accumulate in the diaphragm pores, blocking both bulk and ion flow. This reduces the effective diaphragm area, leading to an increase in voltage and eventually causing premature shutdown of the electrolytic cell. This is called "gas locking."

U.S. Pat. No. 3,853,720 teaches the treatment of diaphragms containing both asbestos and synthetic fibers with ion exchange resins to help solve this problem.

Several patents describe porous PTFE diaphragms made by combining PTFE powder or fiber with a sacrificial filler. The mixture is formed into a sheet and the filler is removed by dissolving or decomposing it, leaving porous PTFE. These diaphragms generally operate at a high cell voltage.

Other patents describe synthetic diaphragms prepared by a PTFE fiber slurry deposition process. The size, shape and size distribution of the PTFE fiber available leads to a large pore, inherently weak, nonuniform structure which must be made very thick to provide utility. The result is high cell voltage.

Other patents describe a single-layer diaphragm made of expanded polytetrafluoroethylene (EPTFE) which is wettable by various methods, including impregnating it with a solution of a perfluoro cation exchange resin. Without wettability achieved with a chemically resistant coating, an adequate level of hydrophilicity is not maintained and "gas locking" occurs reducing the effective diaphragm area leading to an increase in operating voltage.

U.S. Pat. No. 3,944,477 describes a diaphragm of porous PTFE sheet material with a microstructure characterized by nodes and fibrils and having a multilayer structure wherein a number of such sheets are bonded together. Initial wettability is achieved by treatment with acetone and water, but treatment of the diaphragm with acetone and water alone does not provide long-term wetting. In the harsh environment of an electrolytic cell such as a chloralkali cell, the acetone and water do not provide long-term hydrophilicity and the diaphragm prematurely fails.

Other improvements in this technology which try to solve the problems of the prior art diaphragms, such as short life or gas blocking (as a result of incomplete wetting) or side-to-side non-uniformity of the diaphragm structure involve using multiple layers of EPTFE which are at least partially coated with a perfluoro ion exchange polymer. This provides more uniform flow rates across the diaphragm, resulting in improved current efficiency. The diaphragm may initially contain water soluble surfactant within its pores to enhance initial wetting. While this improvement represents an advance over the prior art, it has not been possible to reproduce satisfactory wetting without leaving microscopic air bubbles in the wetted diaphragm.

The present invention solves the problem of reproducible initial wetting of the dried diaphragm without losing any of the other desirable features of the prior art.

SUMMARY OF THE INVENTION

An improved wetted diaphragm for electrolysis is provided comprising a porous, shaped article made from porous, polytetrafluoroethylene or expanded polytetrafluoroethylene, such shaped article having at least a portion of its interior pore surfaces coated with a fluorinated ion exchange polymer. Preferably, the diaphragm comprises a multilayer, porous, composite, shaped article made from multiple layers of porous, expanded polytetrafluoroethylene bonded together. At least a portion of its interior pore surfaces of the diaphragm are coated with a fluorinated ion exchange polymer. Preferably, the diaphragm has all of its exterior surfaces and substantially all of its interior pore surfaces coated with a perfluoro ion exchange polymer. The diaphragm is wetted with a liquid which has a surface tension between 22 and 45 dynes/cm, preferably 25–40 dynes/cm, provided the liquid does not dissolve all the perfluoro ion exchange polymer. Preferably, the diaphragm is wetted with an aqueous solution of about 3–6.5% butanol. In this process, the wetting solution facilitates initial wetting and freedom from initial gas locking, while the fluorinated ion exchange polymer facilitates long-term wetting and freedom from later gas locking.

DETAILED DESCRIPTION OF THE INVENTION

A porous, liquid-permeable shaped article is provided which has its interior and exterior surfaces coated with a perfluoro ion exchange polymer to render the article hydrophilic so as to resist gas locking in aqueous media. The article is also wetted with a wetting solution to assist in initial water penetration into the pores of the article. More specifically, a composite, porous, liquid permeable diaphragm is provided which is a multi-layer structure of discrete, bonded layers of porous EPTFE. An improved electrolytic cell is provided having the composite diaphragm as the porous separator in electrolysis processes, particularly electrolysis of alkali halide solutions. The diaphragm is also useful as an improved filter medium. The shaped article of the present invention is frequently a flat sheet for installation in a filter-press electrolysis cell, but it may be cylindrical or any shape required to cover the cathodes in available cells.

As noted above, diaphragms may be made in a variety of ways, but the best known to date have been based on expanded polytetrafluoroethylene (EPTFE) containing nodes and fibrils. Preferably, the pores of the diaphragm are partially or completely coated with a perfluoro ion exchange polymer, particularly those in the acid (H) or salt (Na or K) form, to provide long-term hydrophilicity.

Electrolytic performance is greatly improved by using multiple layers of the above porous polymer, in order to provide uniform liquid flow rates at all parts of the diaphragm, and consequently improved long-term current efficiency. Multiple layers of the porous polymer also improve the strength and durability of the diaphragm.

One way of making the porous EPTFE structure is to start with EPTFE sheeting having a microstructure characterized by a series of nodes interconnected by fibrils and having a Gurley air flow of 0.8 seconds to 27 seconds, a thickness between 10 and 250 micrometers (preferably between 25 and 125 micrometers), and a methanol bubble point (ASTM F316-80) between 4.8 and 276 kPa. This sheeting may be wound on a cylindrical mandrel, the length and diameter of which can be varied to give the desired dimensions for the finished sheet. Multiple layers, preferably greater than 4, are wound onto the mandrel and the number of layers is adjusted to give the desired thickness and uniformity. The layers of the porous polymer are restrained at the ends of the mandrel by mechanical clamps or bands.

The layers of EPTFE sheeting are bonded together by immersion in a molten salt bath at temperature above the crystalline melting point of EPTFE. The layered EPTFE composite is allowed to cool slowly on the mandrel in air. The layer composite is cut and removed from the mandrel to yield a flat sheet.

Impregnation of the layered flat sheet with the fluorinated ion exchange polymer is carried out by using an alcohol-based liquid composition of ion exchange resin, preferably a perfluorosulfonic acid polymer or a perfluorocarboxylic acid polymer. Polymer solids loading in the liquid composition can generally range from 0.5% up to 10%. The layered flat sheet is fully wet with impregnating liquid composition of ion exchange resin. The liquid composition of ion exchange resin is introduced from one side of the sheet so as to avoid trapping air inside the structure.

Another feature of the preferred coating process is to evacuate most of the air from the EPTFE before the liquid composition of ion exchange resin is added to just one surface of the EPTFE. A suitable vacuum is an absolute pressure of 125 mm Hg, but the absolute pressure is not critical. It is believed that this feature causes the liquid composition to move in just one direction through the EPTFE and it encounters less air which could form air bubbles during the coating process and thus prevent coating of local areas of the EPTFE.

The liquid composition of ion exchange resin is used to impregnate the EPTFE by coating the layered sheet, preferably coating the exterior surfaces and at least a portion of the interior pore surfaces of the EPTFE layered sheet with the ion exchange polymer. The liquid composition may be prepared by the method described in U.S. Pat. No. 4,433,082, which also describes how to make such compositions. A preferred composition contains 4% perfluorosulfonic acid polymer, 10% 1-methoxy-2-propanol and 8% water in ethyl alcohol. The preferred particle size of the ion exchange polymer in the liquid composition is less than 100 Angstroms, as determined by small angle x-ray scattering.

The term "fluorinated polymer" generally means a polymer in which, after loss of any R group by hydrolysis to ion exchange form, the number of F atoms is at least 90% of the total number of F, H and Cl atoms in the polymer. For chloralkali cells, perfluorinated polymers are preferred, though the R in any —COOR group need not be fluorinated because it is lost during hydrolysis. The fluorinated polymers are preferably so-called carboxyl polymers or so-called sulfonyl polymers.

The carboxyl polymers have a fluorocarbon backbone chain to which are attached the functional groups or pendant side chains which in turn carry the functional groups. When the polymer is in melt-fabricable form, the pendant side chains can contain, for example, —[—CFZ—]$_t$—W groups wherein Z is F or CF$_3$, t is 1 to 12, and W is —COOR or —CN, wherein R is lower alkyl. Preferably, the functional group in the side chains of the polymer will be present in terminal O—[—CZF—]$_t$—W groups wherein t is 1 to 3.

Polymers containing —(OCF$_2$CF{CF$_3$})$_m$OCF$_2$CF{CF$_3$}CN side chains, in which m is 0, 1, 2, 3, or 4, are disclosed in U.S. Pat. No. 3,852,326. Polymers containing —(CF$_2$CFZ)$_m$OCF$_2$COOR side chains, where Z and R have the meaning defined above and m is 0, 1, or 2 (preferably 1) are disclosed in U.S. Pat. No. 4,267,364. The above references also describe how to make these fluorinated ion exchange polymers.

Polymers containing terminal —O(CF$_2$)$_v$W groups, where W is defined as —COOR or —CN and v is from 2 to 12 are preferred. They are disclosed in U.S. Pat. Nos. 3,641,104, 4,178,218, 4,116,888, and British Pat. Nos. 2,053,902 and 1,518,387. These groups may be part of —(OCF$_2$CFY)$_m$—O—(CF$_2$)$_v$—W side chains, where Y=F, CF$_3$ or CF$_2$Cl. Especially preferred are polymers containing such side chains where v is 2, which are described in U.S. Pat. Nos. 4,138,426 and 4,487,668; and where v is 3, which are described in U.S. Pat. No. 4,065,366. Among these polymers, those with m=1 and Y=CF$_3$ are most preferred. The above references also describe how to make these fluorinated ion exchange polymers.

The fluorinated polymer used to coat the EPTFE may also be so-called sulfonyl polymers. The sulfonyl polymers with which the present invention is concerned are fluorinated polymers with side chains containing the group —CF$_2$CFR$_f$SO$_2$X, wherein R$_f$ is F, Cl, CF$_2$Cl or a C$_1$ to C$_{10}$ perfluoroalkyl radical, and X is F or Cl, preferably F. Ordinarily, the side chains will contain —OCF$_2$CF$_2$CF$_2$SO$_2$X or —OCF$_2$CF$_2$SO$_2$F groups, preferably the latter. For use in chloralkali membranes, perfluorinated polymers are preferred. Polymers containing the side chain —OCF$_2$CF{CF$_3$}O)$_k$—(CF$_2$)$_j$—SO$_2$F, where k is 0 or 1 and j is 3, 4, or 5, may be used. These are described in British Patent No. 2,053,902. Polymers containing the side chain —CF$_2$CF$_2$SO$_2$X where X is F or Cl, preferably F, are described in U.S. Pat. No. 3,718,627. The above references also describe how to make these fluorinated ion exchange polymers.

Preferred polymers contain the side chain —(OCF$_2$CFY)$_r$—OCF$_2$CFR$_f$SO$_2$X, where R$_f$, Y and X are defined above and r is 1, 2, or 3, and are described in U.S. Pat. No. 3,282,875. Especially preferred are copolymers containing the side chain —OCF$_2$CF{CF$_3$}OCF$_2$CF$_2$SO$_2$F.

Polymerization can be carried out by the methods described in the above references. Especially useful is solution polymerization using ClF$_2$CFCl$_2$ solvent and (CF$_3$CF$_2$COO)$_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The perfluoro ion exchange polymer is a copolymer of tetrafluoroethylene with one of the functional comonomers disclosed herein. The ratio of tetrafluoroethylene to functional comonomers on a mole basis is 1.5 to 5.6:1. For each comonomers, the most preferred ratio of tetrafluoroethylene to functional comonomers is determined by experiment. Copolymers with high ratios of tetrafluoroethylene to comonomers are less soluble than those with low ratios. It is desirable to have a liquid composition with most micelles of less than 100 Angstroms, but an alternative is to remove the larger micelles by filtration or centrifugation. In fact, filtration of the fluorinated polymer before impregnation of the EPTFE support is a good precaution regardless of the tetrafluoroethylene to comonomers ratio.

To make the lowest equivalent weight ion exchange polymers, copolymer in the melt-fabricable (for example, —SO$_2$F or —COOCH$_3$) form may be extracted as in U.S. Pat. No. 4,360,601 and the extracted polymer isolated for use in making the diaphragm. The extract has lower equivalent weight than the starting material.

After impregnation with the fluorinated ion exchange polymer, the diaphragm may be dried, stored, shipped, and installed dry in a diaphragm electrolytic cell. Prior to commencing operations in an electrolytic cell, the diaphragm must be fully wet. In practice, as start-up of the electrolytic cell approaches, the diaphragm is wet with the wetting solution. Either the anolyte space or the catholyte space or both spaces of the electrolytic cell are filled with the wetting solution. Preferably, only one side of the cell is filled with the wetting solution. The diaphragm is soaked with the wetting solution until it is fully wet. The duration of the wetting process and the temperature of the wetting solution are not critical but may be in the range of 10 minutes to 24 hours, preferably about 3 hours and at a temperature of about 15° C. to about 100° C., preferably 25° C. It is also possible to impregnate the diaphragm by causing the wetting solution to flow through the diaphragm at atmospheric pressure or under vacuum. In practice, the wetting solution may be applied by gravity flow, wherein the level of liquid in the anolyte space is sufficiently higher than that in the catholyte space such that flow starts. The flow rate is not critical, but may be in the range of 0.1-1.0 cc wetting solution per hour per cm$^2$ of diaphragm. It is also possible to wet the diaphragm before it is mounted in the cell. It is also possible to pump the wetting solution through the diaphragm. It is preferable to apply wetting solution only to one side of the diaphragm in order to reduce the likelihood of trapping air bubbles in the pores of the diaphragm. It is also possible to pump the solution through the diaphragm and/or draw it through under vacuum.

In order to ascertain whether the diaphragm is satisfactorily "wet," the diaphragm may be visually observed. Customarily, the EPTFE diaphragm is white. The wetted diaphragm is darker-similar in appearance to a piece of white paper which is then soaked with water. If the diaphragm is not fully "wet," translucent or lighter areas or white patches or dots will be readily apparent.

It is also possible to ascertain whether the diaphragm is wet by operating the diaphragm in the electrolytic cell. In a typical chloralkali electrolytic cell operating at 85° C. utilizing a diaphragm of EPTFE impregnated with a fluorinated ion exchange polymer having the side chain—OCF$_2$CF{CF$_3$}OCF$_2$CF$_2$SO$_2$F— and fully wet with an aqueous solution of 3% butanol, the cell voltage is from 3.05 V to 3.25 V. If the diaphragm is not fully wet, gas locking occurs and the voltage will increase. The increase in the voltage depends on the extent of wetting. If the diaphragm is not fully wet, electrolyte flow across the diaphragm is reduced and the voltage to operate the cell at the same rate increases.

Among the most suitable wetting solutions are lower alcohols, especially in aqueous solution. Some of them are well suited for easy recovery from the pre-start-up catholyte liquor by steam distillation or topping distillation. Care should be taken to make sure toxicity is not a severe problem. Preferably, the wetting solution is not a flammable solvent or one that is a threat to the ozone layer of the upper atmosphere, such as chlorofluorocarbons. Further, the wetting solution should not dissolve excessive amounts of the ion exchange polymer.

The nature of the wetting solution is not critical as long as its surface tension is between 22 and 45 dynes/cm at 25° C. The wetting solutions of the present invention include aqueous solutions of 15%-100% ethanol, 20%-100% acetone, 25%-100% methanol, 15%-100% acetonitrile, 2%-100% butanol-1, 50%-100% propanol, 1%-100% iso-amyl alcohol, 2%-10% iso-butyl alcohol, 20%-100% octyl alcohol and 4%-10% phenol. It is also possible to formulate the wetting solution from aqueous solutions of iso-butyl acetate, ethyl acetate, methyl acetate, methyl formate, propyl acetate or propyl formate.

An aqueous solution of 3% butanol, at a surface tension of 40 dynes/cm, wets the diaphragm, but not as fast as 6% butanol, while 1.5% aqueous butanol, at a surface tension of 48 dynes/cm, generally does not wet out the diaphragm in 24 hours. Ethanol with a surface tension 22 dynes/cm is successful in wetting out the diaphragm, but can dissolve too much of the ion exchange polymer, creating some problems in control of the electrolytic process, longevity of the diaphragm and waste recovery.

If the ion exchange polymer is soluble in the wetting solution, the diaphragm is not maintained "wet," gas locking occurs reducing the effectiveness of the diaphragm, ultimately leading to an increase in operating voltage of the electrolytic cell. Solubility of ion exchange polymers is generally greater when they are in the acid (H) or salt (Na or K) form. Also, copolymers are generally more soluble at lower tetrafluoroethylene to comonomers ratios. Further, most ion exchange polymers are polar polymers which are usually dissolved in polar solvents, especially those that are totally miscible with water. As the water content of the wetting solution is increased, its ability to dissolve these copolymers decreases. Therefore, for those wetting solutions which are aqueous, the preferred wetting solution has a high concentration of water; for example, 6% butanol or preferably 3% butanol.

The following examples are included to illustrate the use of wetting solutions of the present invention on diaphragms for electrolytic cells, but are not considered to be limiting. Unless otherwise specified, all parts are by weight and all temperatures are expressed in degrees Centigrade.

EXAMPLES

Example 1

Preparation of the Diaphragm. A section of EPTFE sheeting having an average methanol bubble point of 22 psi, an air flow of 5 seconds as measured by Gurley Densometer and a 1.4 mils thickness was wound around an aluminium mandrel. Twenty layers of this sheeting were wound onto the mandrel. Then, a section of EPTFE sheeting with an average methanol bubble point of 16.5 psi, an air flow of 13 seconds as measured by Gurely Densometer and a thickness of 4.8 mils was wound on top of it. Twenty-eight layers of this sheeting were wound over the initial twenty layers.

The EPTFE sheeting was restrained by placing hose clamps around the circumference of the mandrel at each end. The layers of EPTFE were bonded together by immersing the wound mandrel in a molten salt bath at 367° C. for one minute. The EPTFE wound mandrel was allowed to cool slowly at room temperature air. The exposed outer surface of the EPTFE which is derived from the precursor with the lower methanol bubble point is herein designated as the anode side. The reverse side is herein designated as the cathode side.

The layered EPTFE was cut along the length of the mandrel and removed to form a flat sheet. A section of this layered sheet was impregnated with a liquid composition comprising 4% perfluorosulfonic acid polymer (equivalent weight 920–980) derived from a precursor copolymer of tetrafluoroethylene, $CF_2=CF-O-CF_2-CF(CF_3)-O-CF_2CF_2SO_2F$, 10% 1-methoxy-2-propanol, and 8% water in ethyl alcohol. The wet layered EPTFE structure was restrained to prevent shrinkage and allowed to dry at approximately 23° C. overnight.

The sample described above was wetted out and tested in a conventional laboratory electrolytic cell consisting of a glass anode compartment separated from an acrylic cathode compartment by the diaphragm. The anode compartment consisted of a anolyte chamber having a capacity of about 500 milliliters of liquid, a DSA anode obtained from Oxytech, Inc., a cell heater for temperature control, a brine feed line and a vertical tube connected to a chlorine outlet. The cathode compartment included a heavy gauge mild steel wire screen (of a type used in commercial diaphragm cells) tack-welded to a mild steel current distributor, a hydrogen disengagement area and a catholyte discharge. The cell had an active area of 45 square centimeters, was controlled at a temperature of about 85° C., and operated at a current of 11.25 amperes, resulting in a current density of 2.5 kiloamperes/square meter.

Cell voltages were measured between points near the entrances of the electrodes into the cell bodies, and current efficiencies were calculated from the ratio of the caustic produced over a sixteen hour period (the caustic concentration was determined from the total sample weight) to the number of coulombs supplied to the cell during this time. Electrical energy consumption of the cell is reported in kilo-watthours per metric ton of caustic produced, which is calculated from the cell voltage and current efficiency (CE) by the following equation:

$$\text{Electrical Energy Consumption} = 67010 \times (\text{cell voltage})/(CE),$$

in which the cell voltage is in volts and caustic current efficiency (CE) in percentage rather than fractional units.

Another important parameter reported is k factor, which is the slope of the cell voltage versus the current density at current densities greater than 1 kiloampere per square meter. This normalizes data taken at different current densities, because voltage is approximately linear with current density for all practical current densities above one kiloampere per square meter. For simplicity, the k factor was calculated by the following correlation:

$$k \text{ factor} = (\text{cell voltage} - 2.3 \text{ volts})/(\text{current density}),$$

in which the cell voltage is measured in volts and the current density in kiloampere per square meter.

Typical operating conditions included an exit caustic concentration of approximately 10.5% and salt conversion of 52–55%. Brine was fed into the cells at a rate that was controlled to produce nominally 10.5% caustic. The brine used in the tests was membrane quality brine in which calcium and magnesium levels were kept below 50 ppb total.

Wetting of the Diaphragm: The diaphragm was mounted in the cell sealed in place using gaskets. The anolyte compartment of the cell was filled with 6% n-butyl alcohol in water (having a surface tension of about 36 dynes/cm.) up to 40 cm in the vertical head tube and the catholyte compartment was left empty. The diaphragm was allowed to sit in contact with the butanol solution for 3 hours at room temperature (approximately 23° C.) Any butanol solution permeating through the diaphragm was drained out of the catholyte compartment. 30 milliliters of butanol solution permeated in 3 hours.

After 3 hours, the remaining butanol solution in the anolyte compartment was drained out. The anolyte compartment was rinsed with deionized water. Then the anolyte compartment was filled with brine and the heater was switched on. The catholyte compartment was left empty. When the temperature reached 38° C. (in approximately 12 minutes) vacuum was applied from the catholyte compartment so that the brine flow through the diaphragm is increased and any remaining butanol solution in the diaphragm is washed away. The vacuum was applied for about 15 minutes in which time about 300 milliliters of brine flowed through the diaphragm. Then the anolyte compartment was replenished with brine, and the catholyte compartment was already filled with brine. The cell was allowed to heat to 85° C. and a current of 11.25 amperes was applied. The electrochemical data is summarized in the Table 1.

TABLE 1

| Days on line | Caustic Wt. % | CE % | Cell Volts | Electrical Energy Consumption kWh/MT NaOH | k factor V/(kA/m$^2$) |
|---|---|---|---|---|---|
| 0–29 | 10.74 | 94.68 | 3.15 | 2229.7 | 0.34 |
| 30–85 | 10.57 | 95.78 | 3.18 | 2227.4 | 0.35 |
| 86–108 | 10.56 | 95.72 | 3.20 | 2243.5 | 0.36 |
| 109–122 | 10.41 | 95.33 | 3.17 | 2234 | 0.35 |

Example 2

The composite diaphragm was prepared in the same manner as described in Example 1. The electrochemical testing of this diaphragm was performed in a cell similar to the cell described in Example 1. The wetting of the diaphragm was done differently and is described below.

A section of the dry diaphragm described above was placed in a buchner funnel with the anode side facing up. Then, 100% ethyl alcohol at room temperature (23° C.), with a surface tension of 22 dynes/cm., was poured on to the diaphragm and 63.5 cm of vacuum was applied from the other side of the diaphragm. The diaphragm was completely wet and started to permeate ethanol in 15 minutes. At this time, deionized water at room temperature (23° C.) was poured into the Buchner funnel and was allowed to permeate through (under vacuum) the diaphragm for 30 minutes to wash away the ethyl alcohol.

The wet diaphragm was installed in a cell as described in Example 1 and the anolyte compartment was filled with membrane quality brine (as described in Example 1). The cell heater was switched on and the cell was allowed to heat to 85° C., at the same time the brine permeated through the diaphragm and filled the catholyte compartment. When the cell temperature reached 85° C., a current of 11.25 ampere was applied. The cell was operated for 39 days during this time the average cell voltage was 3.098 volts, producing an average of 10.63% caustic at an average current efficiency of 95.48%. The average power consumption was 2175 kWh/Mt NaOH.

Examples 3–8

The composite diaphragm was prepared in the same manner as described in Example 1. The electrochemical testing of this diaphragm was performed in a cell similar to the cell described in Example 1. The wetting of the diaphragm was done differently and is described below.

The aqueous solutions of diaphragms were mounted in glass test cells for wetting with 61% acetonitrile, 50% acetone and 6.5% butanol. Cathode compartments of the cell were inverted to allow the wetting solution to exit the cell for collection. Wetting solution was poured into the anode compartments with head heights of 40 cm and maintained at 40 cm through the entire procedure. Permeated fluids were collected in 100 cc graduated cylinders attached to the cathode "outlet". Each diaphragm was in process for one hour. The diaphragms were visually inspected to determine that they were fully wet by the wetting solution. The amount of time required to fully wet the diaphragm, the amount of time for the first drop of wetting solution to permeate the diaphragm and the total amount of wetting solution permeating the diaphragm in period of operation were measured, with the following results:

| Ex. | Wetting Solution (aqueous solutions) | Surface Tension (dynes/cm.) | Complete Wetting (minutes) | First Drop of Permeate (minutes) | Period of Operation (hours) | Amount of Permeate |
|---|---|---|---|---|---|---|
| 3 | 61% Acetonitrile | 30 | 3 | 3 | 1 | 28 cc |
| 4 | 50% Acetone | 30.4 | 10 | 7 | 1 | 20 cc |
| 5 | 6.5% Butanol | 35.0 | 20 | 20 | 3 | 27 cc |
| 6 | 6.5% Butanol | 35.0 | 28 | 28 | 3 | 19 cc |
| 7 | 6.5% Butanol | 35.0 | 20 | 20 | 3 | 30 cc |
| 8 | 6.5% Butanol | 35.0 | 38 | 38 | 3 | 20 cc |

Example 9

A section of expanded PTFE sheeting having an average methanol bubble point of 20.2 psi (ASTM F316-80), an air flow of 6.9 seconds as measured by Gurley Densometer (ASTM D726-58) and a 1.4 mils thickness was wound around an aluminum mandrel. Twenty layers of this sheeting were wound onto the mandrel. Then a section of expanded PTFE sheeting with an average methanol bubble point of 15.5 psi (ASTM F316-80), an air flow of 12 seconds as measured by Gurley Densometer (ASTM D726-58) and a thickness of 4.9 mils was wound on top of it. Twenty-seven layers of this sheeting were wound over the initial twenty layers.

The EPTFE sheeting was restrained by placing hose clamps around the circumference of the mandrel at each end. The layers of EPTFE were bonded together by immersing the wound mandrel in a molten salt bath at 367° C. for one minute. The EPTFE wound mandrel was allowed to cool slowly in room temperature air. The exposed outer surface of the EPTFE which had been derived from the precursor with the lower methanol bubble point is herein designated side A (anode side). The reverse side is herein designated as side B (cathode side).

The layered EPTFE was cut along the length of the mandrel and removed to form a flat sheet. A section of this layered sheet was impregnated with a liquid composition comprising 4.5% perfluoro carboxylate polymer (equivalent weight 700–800) derived from a precursor copolymer of tetrafluoroethylene and $CF_2=CF-O-CF_2-CF(CF_3)-O-CF_2CF_2CO_2CH_3$, 10% 1-Methoxy-2-propanol, 1.5% water, 44% methyl alcohol and 40% ethyl alcohol. The wet layered EPTFE structure was restrained to prevent shrinkage and allowed to dry at approximately 23° C. overnight.

The resulting composite diaphragm contained approximately 7.5% perfluorocarboxylate polymer by weight.

The electrochemical testing of this diaphragm was performed in a cell similar to the cell described in Example 1. The diaphragm was wetting with an aqueous solution of 6.5 butanol.

The wet diaphragm was installed in a cell as described in Example 1 and the anolyte compartment was filled with membrane quality brine (as described in Example 1.) The cell heater was switched on and the cell was allowed to heat to 85° C., at the same time the brine permeated through the diaphragm and filled the catholyte compartment. When the cell temperature reached 85° C. a current of 11.25 ampere was applied. The cell was operated for 5 days. During this time the average cell voltage was 3.145 volts, producing an average of 10.5 caustic at an average current efficiency of 94%. The average power consumption was 2250 kWh/Mt NaOH.

Comparative Example A

This example describes a diaphragm which was not wet with a wetting solution having a surface tension between 22 and 45 dynes/cm. A section of expanded PTFE sheeting having an average methanol bubble point of 22 psi (ASTM F316-80), an air flow of 5 seconds as measured by Gurley Densometer (ASTM D726-58) and a 1.4 mils thickness was wound around an aluminium mandrel. Twenty layers of this sheeting were wound onto the mandrel. Then a section of expanded PTFE sheeting with an average methanol bubble point of 16.5 psi (ASTF F316-80), an air flow of 13 seconds as measured by Gurely Densometer (ASTM D726-58) and a thickness of 4.8 mils was wound on top of it. Twenty-eight layers of this sheeting were wound over the initial twenty layers. This composite EPTFE sheeting had an air flow of 424 secs as measured by Gurley Densometer (ASTM D726-58).

The EPTFE sheeting was restrained by placing hose clamps around the circumference of the mandrel at each end. The layers of EPTFE were bonded together by immersing the wound mandrel in a molten salt bath at 367° C. for one minute. The EPTFE wound mandrel was allowed to cool slowly in room temperature air. The exposed outer surface of the EPTFE which had been derived from the precursor with the lower methanol bubble point is herein designated as side A (anode side). The reverse side is herein designated as side B (cathode side).

The layered EPTFE was cut along the length of the mandrel and removed to form a flat sheet. A section of this layered sheet was impregnated with a liquid composition comprising 3.6% perfluoro sulfonic acid polymer (equivalent weight 650-750) derived from a precursor copolymer of tetrafluoroethylene and $CF_2=CF-O-CF_2-CF(CF_3)-O-CF_2CF_2SO_2F$, 2% Merpol® HCS (a surfactant containing Aliphatic Alcohol Ethoxylate, Hexylene Glycol and Water manufactured by E. I. du Pont de Nemours and Company) 10% 1-METHOXY-2-PROPANOL, 25% methyl alcohol and 8% water in ethyl alcohol. The wet layered EPTFE structure was allowed to dry at approximately 23° C. overnight.

The resulting composite diaphragm contained 3.8% perfluorosulfonic acid by weight. The sample described above was tested in a laboratory electrolytic cell as described in Example 1.

Attempted Wetting of the Diaphragm

The diaphragm was sealed in place using EPDM gaskets. The anolyte compartment of the cell was filled with deionized water up to 6 cm in the vertical head tube, the heater was switched on (set at 65° C.) and the catholyte compartment was left empty. A slow water feed to the anolyte compartment was started at this time. This was done to make sure that the anolyte compartment remained filled with water. The diaphragm was allowed to sit in contact with the deionized water for 18 hours at 65° C. Any deionized water permeating through the diaphragm was drained out of the catholyte compartment.

After 18 hours, the water feed and the heat was turned off, the anolyte compartment was drained out and the diaphragm was visually inspected for complete wet out. It was seen that the diaphragm was not completely translucent (grey-which indicates complete wetting). There were areas which were opaque and white indicating incomplete wetting of the diaphragm. The cell was reassembled, the anolyte compartment was filled with deionized water up to 40 cm in the vertical anolyte head tube, the water feed and heat (set at 65° C.) was turned on as before. Vacuum was then applied from the catholyte compartment to wash out the water soluble surfactant from the diaphragm. Vacuum was applied for 75 minutes and 2000 ml of water permeated through the diaphragm during this time.

The cell was then again disassembled, and the diaphragm, on visual inspection, was again found to be incompletely wetted. The cell was again reassembled with this diaphragm in it, and the anolyte and the catholyte compartments were then filled with brine and the heater was switched on and the cell was allowed to heat to 85° C.

Cell Operation and Results

When the cell temperature reached 85° C., a current of 11.25 amperes was applied. The cell voltage at start-up was 3.14 volts and the anolyte head was 39.5 cm. After 5 hours and 15 minutes of operation the cell was shut down because the cell voltage was 3.4 volts and still climbing and the anolyte head was over 80 cm, indicating substantial decrease in flow of anolyte through the diaphragm. The cell was disassembled and the diaphragm was found to be completely white and opaque, indicating "gas locking."

Comparative Example B

A section of expanded PTFE sheeting having an average methanol bubble point of 21 psi (ASTM F316-80), an air flow of 4.5 seconds as measured by Gurley Densometer (ASTM D726-58) and a 1.4 mils thickness was wound around an aluminuum mandrel. Twenty layers of this sheeting were wound onto the mandrel. Then a section of expanded PTFE sheeting with an average methanol bubble point of 16.5 psi (ASTM F 316-80), an air flow of 12 seconds as measured by Gurley Densometer (ASTM D726-58) and a thickness of 4.8 mils was wound on top of it. Twenty-eight layers of this sheeting were wound over the initial twenty layers.

This composite EPTFE sheeting had an air flow of 424 secs as measured by Gurley Densometer (ASTM D726-58).

The EPTFE sheeting was restrained by placing hose clamps around the circumference of the mandrel at each end. The layers of EPTFE were bonded together by immersing the wound mandrel in a molten salt bath at 367° C. for one minute. The EPTFE wound mandrel was allowed to cool slowly in room temperature air. The exposed outer surface of the EPTFE which had been derived from the precursor with the lower methanol bubble point is herein designated side A (anode side). The reverse side is herein designated as side B (cathode side).

The layered EPTFE was cut along the length of the mandrel and removed to form a flat sheet. A section of this layered sheet was impregnated with a liquid composition comprising 3.6% perfluoro sulfonic acid polymer (equivalent weight 650–750) derived from a precursor copolymer of tetrafluoroethylene and $CF_2=CF-O-CF_2-CF(CF_3)-O-CF_2CF_2SO_2F$, 2% Merpol® HCS (a surfactant containing Aliphatic Alcohol Ethoxylate, Hexylene Glycol and Water manufactured by E. I. du Pont de Nemours and Company) 10% 1-METHOXY-2-PROPANOL, 6.3% water in ethyl alcohol. The wet layered EPTFE structure was restrained to prevent shrinkage and allowed to dry at approximately 23° C. overnight.

The resulting composite diaphragm contained 5.1% perfluorosulfonic acid by weight. The sample was tested in a laboratory electrolytic cell as described in Example 1.

Attempted Wetting of Diaphragm

The diaphragm was attempted to be wetted in a manner similar to that in Comparative Example A. The degree of wetting in this case was much better than the sample in Comparative Example A; there were no obviously white areas in the wet diaphragm. However, the wet diaphragm was not as translucent as it was in the case of, for example, Example 1 where a 6% butanol solution was used for wetting the diaphragm (which did not have a surfactant in it).

Cell Operation and Results

The cell was operated in a similar manner as in Comparative Example A. The initial cell voltage at start-up was 3.06 volts and anolyte head of 38 cms. After 4 hours 37 minutes, the cell voltage was 3.34 volts and climbing and the head was 49 cm and climbing. At this time, the cell was terminated and disassembled. A visual inspection of the diaphragm showed areas of white opaque patches indicating that "gas locking" had begun.

I claim:

1. An article comprising (a) a diaphragm which is used for electrolyzing alkali metal chloride solutions, (b) said diaphragm having at least a portion of its exterior surfaces and a portion of its interior pores coated with a perfluoro ion exchange polymer or a solution comprising said perfluoro ion exchange polymer and a solvent or dispersant for said polymer and (c) said diaphragm has been coated with a wetting agent which has a surface tension of about 22 to 45 dynes/cm, wherein said wetting agent is different than said solvent or dispersant, if any.

2. The article of claim 1 in which the alkali metal chloride solution is a sodium chloride solution.

3. The article of claim 1 in which the diaphragm has one or more layers of a porous support comprising polytetrafluoroethylene or expanded polytetrafluoroethylene.

4. The diaphragm of claim 1 in which the perfluoro ion exchange polymer is perfluoro carboxylic acid polymer of equivalent weight in the range of about 650–1450.

5. The diaphragm of claim 1 in which the perfluoro ion exchange polymer has a ratio of tetrafluoroethylene to functional comonomers of 1.5:1 to 10.1:1.

6. The diaphragm of claim 1 in which the perfluoro ion exchange polymer is a perfluorosulfonic acid polymer of equivalent weight in the range of about 650–1450.

7. The diaphragm of claim 1 in which the perfluoro ion exchange polymer is a mixture of perfluorosulfonic acid polymer and perfluoro carboxylic acid polymer both with equivalent weight in the range of about 650–1450.

8. The article of claim 1 in which the solution is an aqueous solution of 1.5%–6.5% butanol.

9. The article of claim 8 in which the solution is an aqueous solution of about 3% butanol.

10. A process for preparing a diaphragm for use in electrolyzing metal chloride solutions comprising wetting said diaphragm, said diaphragm having at least a portion of its exterior surfaces and a portion of its interior pores coated with a perfluoro ion exchange polymer or a solution comprising said perfluoro ion exchange polymer and a solvent or dispersant for said polymer, with a wetting agent which has a surface tension of about 22 to 45 dyne/cm, said wetting agent is applied to the diaphragm after the perfluoro ion exchange polymer or said solution.

11. The process of claim 10 in which the alkali metal chloride solution is a sodium chloride solution.

12. The process of claim 10 in which the diaphragm has one or more layers of porous support comprising polytetrafluoroethylene or expanded polytetrafluoroethylene.

13. The process of claim 10 in which the perfluoro ion exchange polymer is a perfluoro carboxylic acid polymer of equivalent weight in the range of about 650–1450.

14. The process of claim 10 in which the perfluoro ion exchange is polymer has a ratio of tetrafluoroethylene to functional comonomers of 1.5:1 to 10.1:1.

15. The process of claim 10 in which the perfluoro ion exchange polymer is perfluorosulfonic acid polymer of equivalent weight in the range of about 650–1450.

16. The process of claim 10 in which the perfluoro ion exchange polymer is a mixture of perfluoro carboxylic acid polymer and perfluorosulfonic acid polymer both with equivalent weight in the range of about 650–1450.

17. The process of claim 10 in which the solution is an aqueous solution of 1.5%–6.5% butanol.

18. The process of claim 17 in which the solution is an aqueous solution of about 3% butanol.

19. The process of claim 10 in which the diaphragm is placed in a cell for electrolyzing the metal chloride solution prior to wetting the diaphragm with the solution.

20. The process of claim 19 in which the wetting liquid is recovered from its aqueous solution by distillation.

21. The process of claim 19 in which the cell is operated to electrolyze the aqueous metal chloride solution and the wetting liquid is recovered from the aqueous metal chloride solution or the aqueous caustic solution by distillation.

22. The process of claim 19 in which the diaphragm is soaked in an aqueous solution of about 3% butanol for at least about 10 minutes to three hours.

23. An electrolytic cell comprising anode and cathode compartments, separated by a diaphragm, in which at least a portion of its exterior surfaces and a portion of its interior pores of said diaphragm have been coated with a perfluoro ion exchange polymer or a solution comprising said perfluoro ion exchange polymer and a solvent or dispersant for said polymer and the diaphragm is coated with a wetting agent which has a surface tension of about 22 to 45 dynes/cm, wherein said wetting agent is different than said solvent or dispersant, if any.

* * * * *